US012508805B2

(12) United States Patent
Yamamoto et al.

(10) Patent No.: US 12,508,805 B2
(45) Date of Patent: Dec. 30, 2025

(54) IMAGE RECORDING APPARATUS

(71) Applicant: BROTHER KOGYO KABUSHIKI KAISHA, Nagoya (JP)

(72) Inventors: Keisuke Yamamoto, Nagoya (JP); Tomoyuki Kubo, Nagoya (JP); Shoji Sato, Okazaki (JP); Satoshi Yoshioka, Nagoya (JP); Nobumasa Tanaka, Nagoya (JP); Kenshiro Hanamaru, Nagoya (JP); Yoshiteru Saito, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 241 days.

(21) Appl. No.: 18/345,415

(22) Filed: Jun. 30, 2023

(65) Prior Publication Data

US 2025/0001757 A1 Jan. 2, 2025

(30) Foreign Application Priority Data

Jun. 30, 2022 (JP) ................................ 2022-106429

(51) Int. Cl.
*B41J 2/045* (2006.01)
*B41J 2/14* (2006.01)

(52) U.S. Cl.
CPC ......... *B41J 2/04541* (2013.01); *B41J 2/0457* (2013.01); *B41J 2/04581* (2013.01); *B41J 2/14201* (2013.01)

(58) Field of Classification Search
CPC ................................................... B41J 2/04541
See application file for complete search history.

(56) References Cited

U.S. PATENT DOCUMENTS

| | | | | |
|---|---|---|---|---|
| 2002/0109414 | A1 | 8/2002 | Nitta et al. | |
| 2007/0046703 | A1 * | 3/2007 | Tamura ................ | B41J 2/04588 347/9 |
| 2014/0292858 | A1 * | 10/2014 | Wanibe ...................... | B41J 2/14 347/12 |
| 2017/0341379 | A1 * | 11/2017 | Umeda ................ | B41J 2/04586 |
| 2023/0264470 | A1 * | 8/2023 | Nitta .................... | B41J 2/04541 347/5 |

FOREIGN PATENT DOCUMENTS

| | | |
|---|---|---|
| JP | 2000-121689 A | 4/2000 |

* cited by examiner

*Primary Examiner* — Shelby L Fidler
(74) *Attorney, Agent, or Firm* — Scully, Scott, Murphy & Presser, P.C.

(57) ABSTRACT

There is provided an image recording apparatus including: a recording head unit; a head support; a power supply trace; and a ground trace. The recording head unit includes: a portion of the power supply trace; a portion of the ground trace; a drive circuit to which a voltage is supplied via the power supply trace; a recording element to which a drive voltage is applied by the drive circuit and to which the ground trace is connected; and a capacitive element.

9 Claims, 9 Drawing Sheets

IMAGE RECORDING APPARATUS

REFERENCE TO RELATED APPLICATIONS

This application claims priority from Japanese Patent Application No. 2022-106429 filed on Jun. 30, 2022. The entire content of the priority application is incorporated herein by reference.

BACKGROUND ART

As an example of a recording head unit provided in an image recording device, a head unit equipped with an inkjet print head is known. A known inkjet print head has a plurality of ink chambers and is configured to eject ink from each of the ink chambers by applying pressure changes to each of the ink chambers through the distortion deformation of the piezoelectric members caused by the application of voltage. The head unit integrates the inkjet print head and the drive circuit configured to drive the inkjet print head.

The head unit described above is provided with a capacitor (capacitive element) connected between the power supply lines to the drive circuit. Such a capacitor enables instantaneous current supply to the drive circuit when the inkjet head is driven at high speed, and it is effective to place the capacitor close to the drive circuit. In the head unit described above, the capacitor is installed in the head unit so that it is placed in close proximity to the drive circuit.

DESCRIPTION

In the manufacturing process of the recording head unit, electrical inspections are conducted after the recording head unit is assembled to check for missing parts, circuit damage, circuit connection status, etc. When a capacitive element is incorporated in the recording head unit as described above, connected between the power supply lines to the drive circuit, it is difficult to detect defects in the capacitive element alone, even if an electrical inspection of the entire recording head unit is conducted.

The purpose of the present disclosure is to provide an image recording apparatus configured to accurately detect a failure of a capacitive element in the recording head unit.

In accordance with the present disclosure, there is provided an image recording apparatus including: a recording head unit; a head support configured to support the recording head unit; a power supply trace connected to a power supply terminal; and a ground trace connected to a ground terminal.

The recording head unit includes: a portion of the power supply trace; a portion of the ground trace; a drive circuit to which a voltage is supplied via the power supply trace; a recording element to which a drive voltage is applied by the drive circuit and to which the ground trace is connected; and a capacitive element.

The head support includes a connection trace to be connected to at least one terminal of a pair of terminals of the capacitive element. The capacitive element is configured such that: the capacitive element is in a first state disconnected from at least one of the power supply trace and the ground trace in a case that the capacitive element is not connected to the connection trace, and that the capacitive element is in a second state connected between the power supply trace and the ground trace via the connection trace in a case that the capacitive element is connected to the connection trace.

In a case that the capacitive element is not connected to the connection trace, a voltage between a pair of traces connected to the pair of terminals of the capacitive element is applied by a probe.

According to the image recording apparatus, when the capacitive element is not connected to the connection trace provided in the head support, the capacitive element is disconnected from at least one of the power supply trace and the ground trace. At this time, a voltage can be applied between the traces connected to both ends of the capacitive element by the probe. Therefore, when the capacitive element is not connected to the connection trace provided in the head support, an electrical inspection of the capacitive element can be performed. Therefore, it is possible to accurately detect defects in the capacitive element alone.

FIG. 7A depicts a state of inspecting electrical components other than a second capacitor, and FIG. 7B depicts a state of inspecting the second capacitor.

FIG. 8A depicts a state before the recording head unit is fitted, FIG. 8B depicts a state after the recording head unit is fitted, and FIG. 8C depicts a state after the completion of mounting.

The printer 1 (corresponding to the "image recording apparatus" of the present disclosure) of the embodiment of the present disclosure will be described below with reference to the drawings. With respect to an up-down direction, "UP" is defined as a direction from the back of the paper surface to the front of the paper surface in FIG. 1, and "DOWN" is defined as a direction from the front of the paper surface to the back of the paper surface. With respect to the front-rear direction, the upper side of FIG. 1 is defined as "REAR" and the lower side is defined as "FRONT".

<Overall Configuration of Printer 1>

Figure 1:
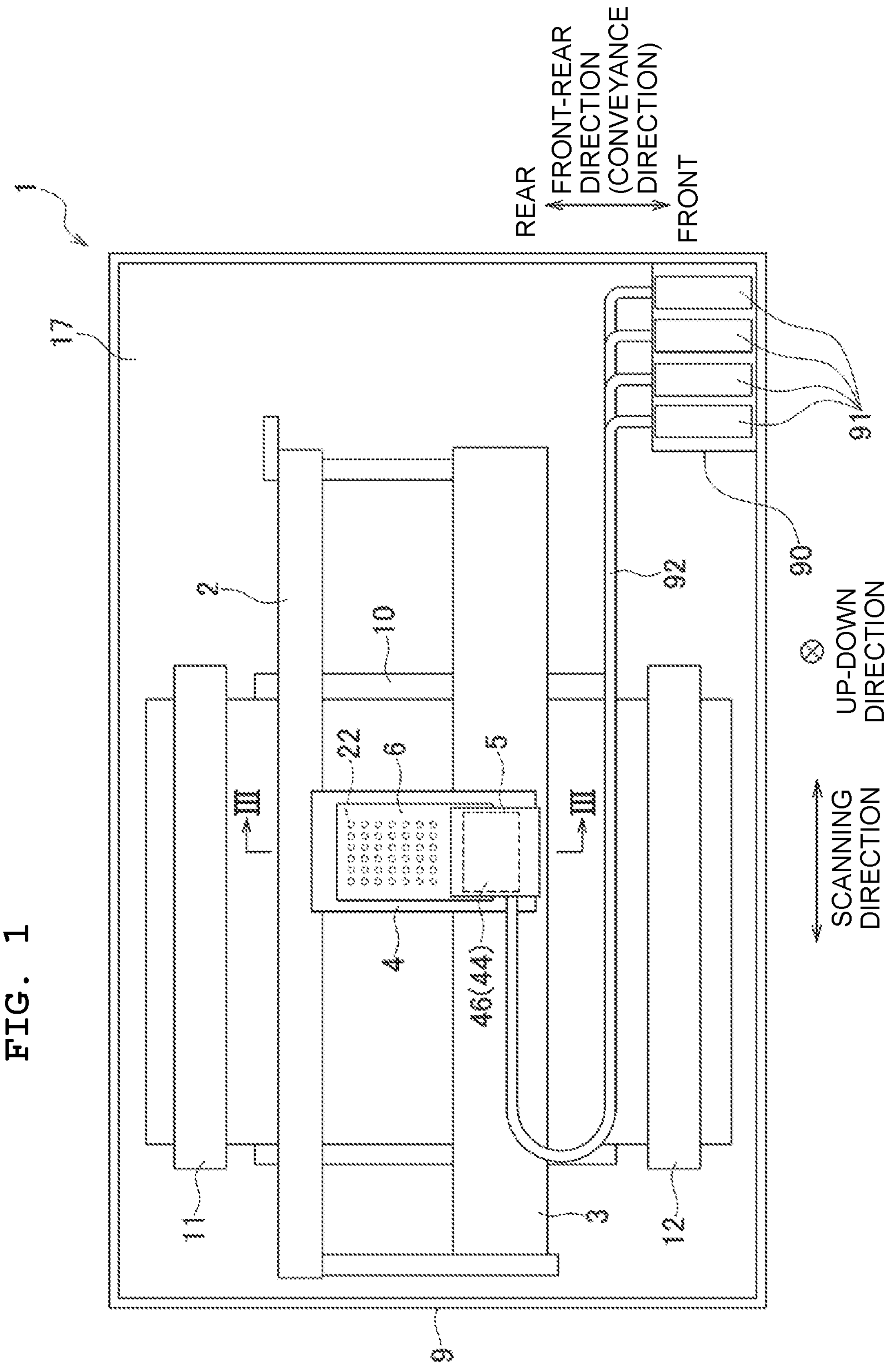
FIG. 1 depicts a schematic diagram of the printer.
Figure 2:
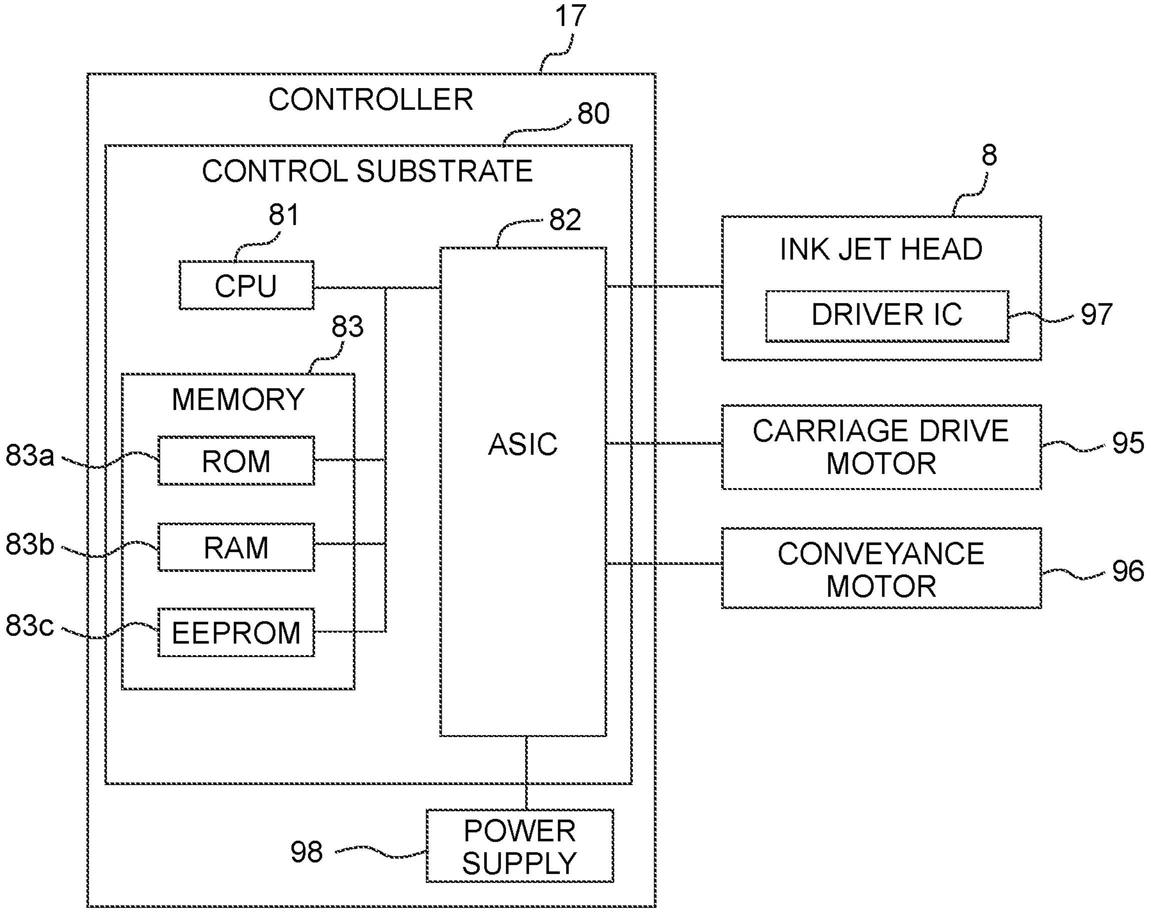
FIG. 2 is a block diagram depicting the electrical configuration of the printer.

With reference to FIGS. 1 and 2, the overall configuration of the printer 1 will be described. As depicted in FIG. 1, the printer 1 mainly includes guide rails 2, 3, a carriage 4, a tube joint 5, a recording head unit 6, a paper feed roller 11, a paper discharge roller 12, a controller 17, and a housing 9.

The guide rails 2, 3 are formed of sheet metal members. The guide rails 2, 3 both extend in the scanning direction. The scanning direction is horizontal and orthogonal to the front-rear direction. The scanning direction is parallel to a left-right direction in FIG. 1. The guide rails 2, 3 are spaced apart from each other in the front-rear direction. The guide rail 2 is positioned rearward of the guide rail 3. A platen 10 on which the recording paper P is placed is positioned below the guide rails 2, 3.

The carriage 4 is mounted on the two guide rails 2, 3. The carriage 4 is movable in the scanning direction while being guided by the two guide rails 2, 3. The movement range of the carriage 4 with respect to the scanning direction includes a facing area facing the platen 10. The carriage 4 moves from one side of the platen 10 to the other side of the platen 10 in the scanning direction. An unterminated drive belt (not depicted) is wound around a pair of pulleys (not depicted), in the carriage 4. The drive belt runs when the pulleys are driven to rotate by a carriage drive motor 95 (see FIG. 2), which causes the carriage 4 to reciprocate in the scanning direction.

A tube joint 5 is attached to the carriage 4. The ends of tubes 92 connected to each of four ink cartridges 91 are connected to the tube joint 5. The four ink cartridges 91 are mounted in a cartridge mounting section 90 provided at the front end in the housing 9. The four ink cartridges 91 corresponding to four colors (black, yellow, cyan, and magenta) are mounted in the cartridge mounting section 90. The four colors of ink from the four ink cartridges 91 are supplied to the tube joint 5 respectively through the tubes 92.

The recording head unit 6 is removably supported by the carriage 4. In other words, the carriage 4 corresponds to the "head support" of the present disclosure. As will be described in detail later, the recording head unit 6 includes a sub-tank 7 that can be connected to the tube joint 5, an inkjet head 8, and a case 16 that houses the sub-tank 7 and the inkjet head 8 (see FIG. 3). When the sub-tank 7 is connected to the tube joint 5, four colors of ink from the four ink cartridges 91 are supplied to four intra-head flow channels 28 (see FIG. 3) of the inkjet head 8 via the tube joint 5 and sub-tank 7.

A plurality of nozzles 22 are opened on the nozzle surface 20Y (see FIG. 5), which is the lower surface of the inkjet head 8. The ink supplied to the intra-head flow channels 28 in the inkjet head 8 is ejected from the plurality of nozzles 22 of the inkjet head 8 by driving the driver IC 97 (see FIG. 2: corresponds to the "driving circuit" of the present disclosure). A paper feeding roller 11 and a paper discharge roller 12 are driven synchronously by a conveyance motor 96 (see FIG. 2). The paper feeding roller 11 and the paper discharge roller 12 cooperate to convey the recording paper P placed on the platen 10. The conveyance direction of the recording paper P by the paper feeding roller 11 and the paper discharge roller 12 is horizontal and orthogonal to the scanning direction and is directed from rearward to forward.

As depicted in FIG. 2, the controller 17 includes a CPU (Central Processing Unit) 81, an ASIC (Application Specific Integrated Circuit) 82, a memory 83, and a control substrate 80 on which the CPU 81, the ASIC 82 and the memory 83 are mounted. The CPU 81, the ASIC 82, and the memory 83 are connected by an internal bus. The memory 83 includes ROM (Read Only Memory) 83*a*, RAM (Random Access Memory) 83*b*, and EEPROM (Electrically Erasable Programmable Read-Only Memory) 83*c*. Programs for controlling the printer 1 is stored in the ROM 83*a*. The CPU 81 executes the program while using the RAM 83*b* and the EEPROM 83*c*.

The ASIC 82 is electrically connected to the driver IC 97 of the inkjet head 8, the carriage drive motor 95, and the conveyance motor 96. The ASIC 82 is also electrically connected to the power supply 98 mounted on the control substrate 80. The ASIC 82 outputs control signals to the driver IC 97, the carriage drive motor 95, the conveyance motor 96, and the power supply 98, and controls their operation. The controller 17 controls the driver IC 97, the carriage drive motor 95, the conveyance motor 96, etc., based on recording data transmitted from an external device (e.g., PC or smartphone) to alternately execute a conveyance processing and a recording processing to record images, etc. on the recording paper P. Specifically, in the conveyance process, the conveyance motor 96 is controlled to convey the recording paper P in the conveyance direction by the paper feeding roller 11 and the paper discharge roller 12. In the recording process, the driver IC 97 and the carriage drive motor 95 are controlled to eject ink from the nozzles 22 while moving the inkjet head 8 together with carriage 4 in the scanning direction.

<Configuration of Guide Rails 2, 3 and Carriage 4>

Figure 3:
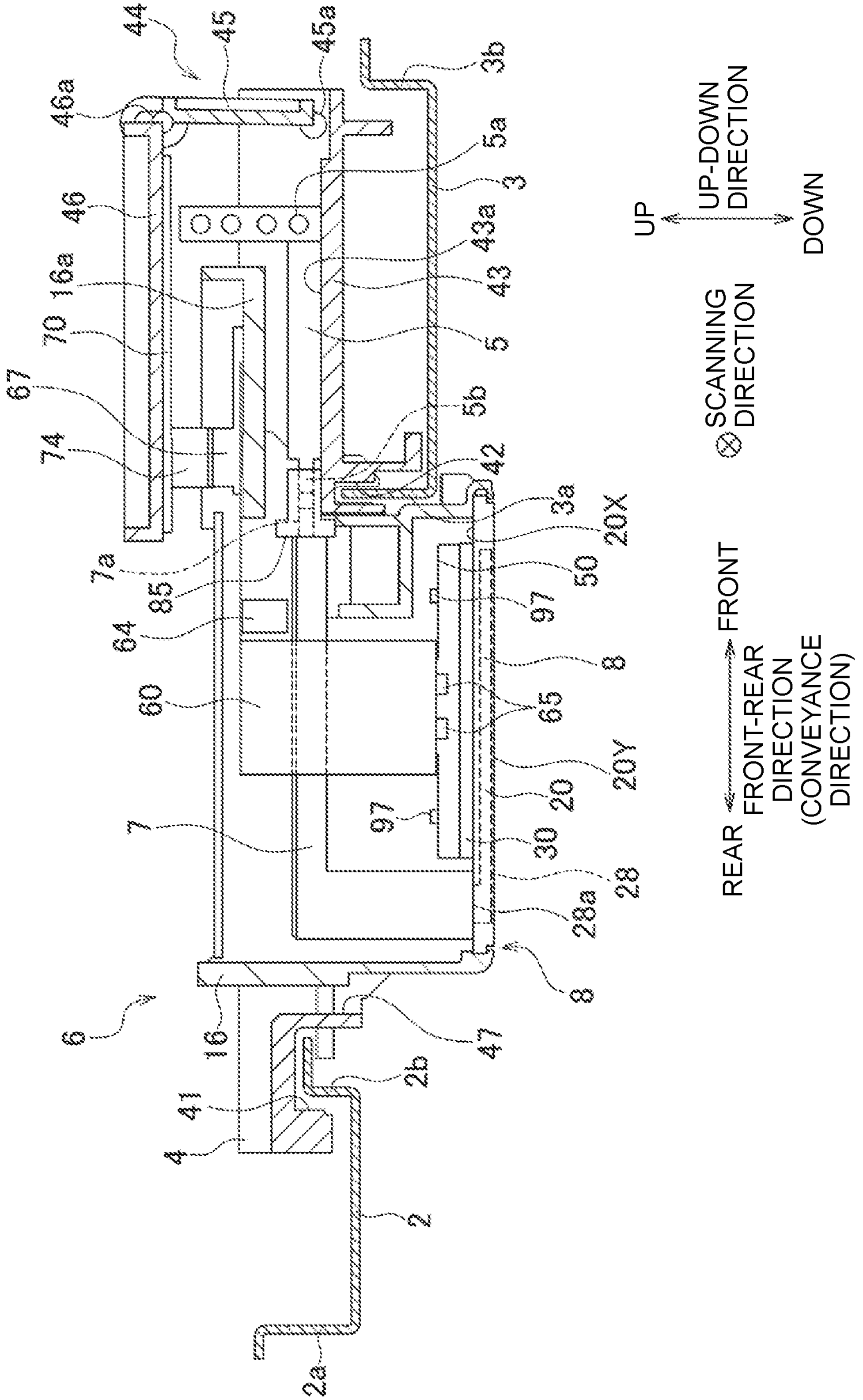
FIG. 3 depicts a III-III line cross-sectional view of the guide rail, carriage and recording head unit depicted in FIG. 1.

The configuration of the guide rails 2, 3 and the carriage 4 will be described with reference to FIG. 3. As depicted in FIG. 3, the guide rail 2 is made of a sheet metal member, and its thickness direction is parallel to the up-down direction. Curved portion 2*a*, 2*b* that are curved upwardly are provided in both ends of the guide rail 2 in the front-rear direction. The curved portion 2*b* at the front end of the guide rail 2 has its upper end bent forward. In other words, the curved portion 2*b* includes a portion extending in the up-down direction and a portion extending in the front-rear direction.

Similarly, the guide rail 3, which is made of a sheet metal member, has its thickness direction parallel to the up-down direction. Curved portion 3*a*, 3*b* that are curved upwardly are provided in both ends of the guide rail 3 in the front-rear direction.

A groove 41, which is open downward and extends along the scanning direction, is formed at the rear end of the carriage 4. The curved portion 2*b* of the guide rail 2 is fitted into the groove 41. In the carriage 4, a groove 42 that is open downward and extends along the scanning direction is formed in the forward part of the carriage 4 from the part where the groove 41 is formed. The curved portion 3*a* provided at the rear end of the guide rail 3 is fitted into the groove 42.

An opening 47 penetrating in the up-down direction is formed in the carriage 4 between the portion in the carriage 4 where groove 41 is formed and the portion in the carriage 4 where groove 42 is formed, with respect to the front-rear direction. In other words, the opening 47 in the carriage 4 is located between the two guide rails 2, 3 with respect to the front-rear direction. The recording head unit 6 is fitted into the opening 47.

The forward end of the carriage 4 is an overlapping portion 43 that overlaps the guide rail 3 in the up-down direction. The overlapping portion 43 is located above the guide rail 3. The overlapping portion 43 has a surface 43*a* that faces upward and extends horizontally. The tube joint 5 is attached to the surface 43*a* of the overlapping portion 43 in the carriage 4.

The carriage 4 has a lever 44 at the forward end in the overlapping portion 43 and a junction substrate 70 attached to the lever 44. The lever 44 has a first member 45 and a second member 46. The first member 45 and the second member 46 are made of resin and have insulating properties. The junction substrate 70 is attached to the second member 46.

The first member 45 is rotatable around a shaft 45*a* that extends along a direction parallel to the scanning direction. The shaft 45*a* of the first member 45 is attached to the overlapping portion 43. The first member 45 extends along an extension direction parallel to a plane orthogonal to the scanning direction (hereinafter referred to as the "orthogonal plane"). The shaft 45*a* is located at one end of the first member 45. The second member 46 is rotatable around a shaft 46*a* extending along a direction parallel to the scanning direction. The shaft 46*a* of the second member 46 is attached to one end of the second member, wherein the one end of the second member is located opposite to the one end where the shaft 45*a* is provided in the first member 45 with respect to the extension direction parallel to the orthogonal plane. The second member 46 extends along a direction parallel to the orthogonal plane. The shaft 46*a* is located at the one end of the second member 46.

The junction substrate 70 is connected to the control substrate 80 of the controller 17 via a connecting member (not depicted) such as an FFC (Flexible Flat Cable). The junction substrate 70 corresponds to the "substrate" of the present disclosure. The junction substrate 70 relays the control substrate 80 and the driver IC 97 of the inkjet head 8. The voltage output from the power supply 98 mounted on the control substrate 80 and the control signals output from the ASIC 82 are supplied to the driver IC 97 via the junction substrate 70.

As described later, the driver IC97 is mounted on a COF (Chip On Film) 50, and an FPC60 is electrically connected to the COF50. The driver IC97 can be electrically connected to the junction substrate 70 via the COF50 and the FPC60. The junction substrate 70 has a connector 74 that can be connected to a connector 67 of the FPC60. When the junction substrate 70 and the FPC60 are connected by the connector 74 and the connector 67, an output terminal 73 (see FIG. 6) of the junction substrate 70 is electrically connected to an input terminal 66 (see FIG. 6) of the FPC60.

The case 16 of the recording head unit 6 has a support portion 16*a* that supports a portion of the FPC 60 where the input terminal 66 is located. When the recording head unit 6 is fitted into the opening 47 of the carriage 4, the support portion 16*a* of the case 16 is located above the overlapping portion 43 of the carriage 4, and is positioned vertically opposite to the rear end of the overlapping portion 43.

The lever 44 moves between a first position (see FIG. 3 and FIG. 8C) and a second position (see FIGS. 8A and 8B) by user operation. When the lever 44 is in the first position, a direction of extension (a longitudinal direction) of the first member 45 in the orthogonal plane is parallel to the up-down direction and a direction of extension (a longitudinal direction) of the second member 46 is parallel to the front-rear direction. When the lever 44 is in the first position, the second member 46 is vertically opposite to the support portion 16*a* above the support portion 16*a* in the case 16 of the recording head unit 6. In other words, the second member 46 of the lever 44 covers the support portion 16*a* provided in the case 16 of the recording head unit 6. When the lever 44 is in the first position, the surface of the second member 46 to which the junction substrate 70 is attached faces downward, and the connector 74 on the junction substrate 70 protrudes downward from the surface of the junction substrate 70. When the lever 44 is in the first position, the connector 74 of the junction substrate 70 is connected to the connector 67 of the FPC 60 supported by the support portion 16*a* in the case 16 of the recording head unit 6.

Figure 8A:
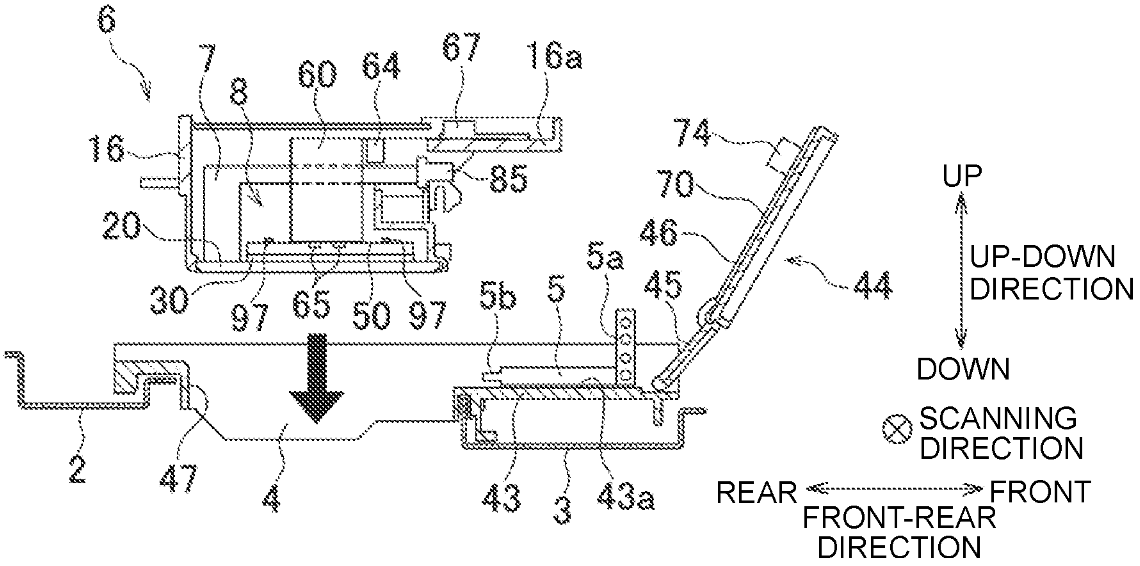
FIGS. 8A to 8C depict the procedure for attaching the recording head unit to the carriage.
Figure 8B:
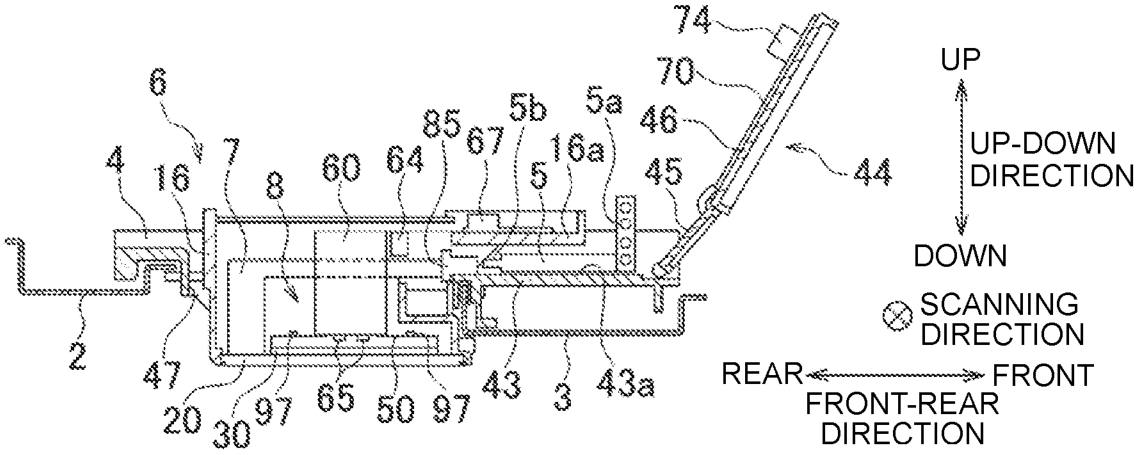

When the second member 46 of the lever 44 in the first position is lifted upward by the user, the connection between the connector 74 and the connector 67 is disconnected. When the lever 44 is further pulled forward by the user, the lever 44 is in the second position as depicted in FIGS. 8A and 8B. When the lever 44 is in the second position, the other end of the first member 45 in the extension direction in the orthogonal plane (the part of the second member 46 to which the shaft 46*a* is attached) is located more forward than the one end in the extension direction (the part attached to the overlapping portion 43). That is, when the position of the lever 44 changes between the first position and the second position, the first member 45 moves between an upright position and an inclined position (an oblique position). In the upright position, the direction of extension, of the first member 45, in the orthogonal plane is parallel to the up-down direction. In the inclined position, the first member 45 is inclined with respect to the up-down direction so that the other end, of the first member 45, in the direction of extension is more forward than the one end, of the first member 45, of the direction of extension.

The tube joint 5 attached to the overlapping portion 43 in the carriage 4 slides frontward and rearward in conjunction with the first member 45 of the lever 44 moving between the upright and inclined positions by an interlocking mechanism (not depicted). Specifically, as the first member 45 of the lever 44 moves from the inclined position to the upright position, i.e., as the lever 44 moves from the second position to the first position, the tube joint 5 slides from the front side to the rear side. This allows the tube joint 5 to be connected to the sub-tank 7. Also, by moving the first member 45 of the lever 44 from the upright position to the inclined position, i.e., by moving the lever 44 from the first position to the second position, the tube joint 5 slides from the rear side to the front side. This allows the connection between the tube joint 5 and the sub-tank 7 to be disconnected.

<Configuration of Tube Joint 5>

The configuration of the tube joint 5 will be described. As depicted in FIG. 3, the tube joint 5 includes a portion extending along the up-down direction and a portion extending rearward from a lower end of the portion extending along the up-down direction. In other words, the tube joint 5 has an inverted L-shape as viewed from a side (in a lateral view). The tube joint 5 is attached to the carriage 4 with the lower surface of the portion extending along the front-rear direction facing the surface 43*a* of the overlapping portion 43.

A cartridge-side connection 5*a* is provided on the wall on one side of the scanning direction in a portion of the tube joint 5 that extends along the up-down direction. The cartridge-side connection 5*a* is connected to the end of the tube 92 connected to the ink cartridge 91. Four cartridge-side connections 5*a* are aligned in the up-down direction, corresponding to four colors: black, yellow, cyan, and magenta.

A head-side connection 5*b* is provided on a lateral wall of the tube joint 5, wherein the lateral wall is located at a rear side of a portion of the tube joint 5 extending along the front-rear direction. The head-side connection 5*b* is connected to the sub-tank 7 that is a part of the recording head unit 6. Four head-side connections 5*b* are aligned in the scanning direction, corresponding to the four colors: black, yellow, cyan, and magenta.

Four ink channels (not depicted) are formed in the tube joint 5. Ink is supplied to the four ink channels via the tubes 92 connected to the four cartridge-side connections 5*a*, respectively. The ink in the ink channels of tube joint 5 is then supplied to other ink channels (not depicted) formed in the sub-tank 7 connected to the head-side connection 5*b*.

<Configuration of Recording Head Unit 6>

The configuration of the recording head unit 6 is described. As depicted in FIG. 3, the recording head unit 6 has a sub-tank 7, an inkjet head 8, and a case 16 that houses the sub-tank 7 and inkjet head 8.

<Sub-Tank 7>

As depicted in FIG. 3, the sub-tank 7 has a portion extending along the front-rear direction and a portion extending downward from the rear end of the portion extending along the front-rear direction. Four connections 7*a* are provided on a lateral wall of the sub-tank 7, the lateral wall is located at the forward side of a portion extending along the front-rear direction of the sub-tank 7. The four connections 7*a* are aligned along the scanning direction. A connection member 85 made of rubber is attached to the connections 7*a*. The four connections 7*a* are connected to the four head-side connections 5*b* on the tube joint 5 respectively via the connection member 85.

Four ink channels (not depicted) are formed in the sub-tank 7. Ink is supplied to the four ink channels respectively from other four ink channels (not depicted) formed in the tube joint 5, which is connected to the sub-tank 7 via the connecting member 85. The lower end of the portion, of the sub-tank 7, extending along the up-down direction is located on an upper surface 20X of the inkjet head 8. The four ink channels formed in the sub-tank 7 are open at the lower end of the portion, of the sub-tank 7, extending along the up-down direction. Ink in the four ink channels of the sub-tank 7 is supplied to the four intra-head flow channels 28 in the inkjet head 8 via ink supply ports 28*a* formed on the upper surface 20X of the inkjet head 8, respectively.

<Inkjet Head 8>

Next, with reference to FIGS. 4 and 5, the detailed configuration of the inkjet head 8 will be described. The inkjet head 8 is equipped with a flow channel unit 20, an actuator unit 30, the COF 50, and the FPC 60. The flow channel unit 20 and the actuator unit 30 correspond to the "head" of the present disclosure. The COF 50 corresponds to the "first trace member" of the present disclosure. The FPC 60 corresponds to the "second trace member" of the present disclosure.

Figure 4:
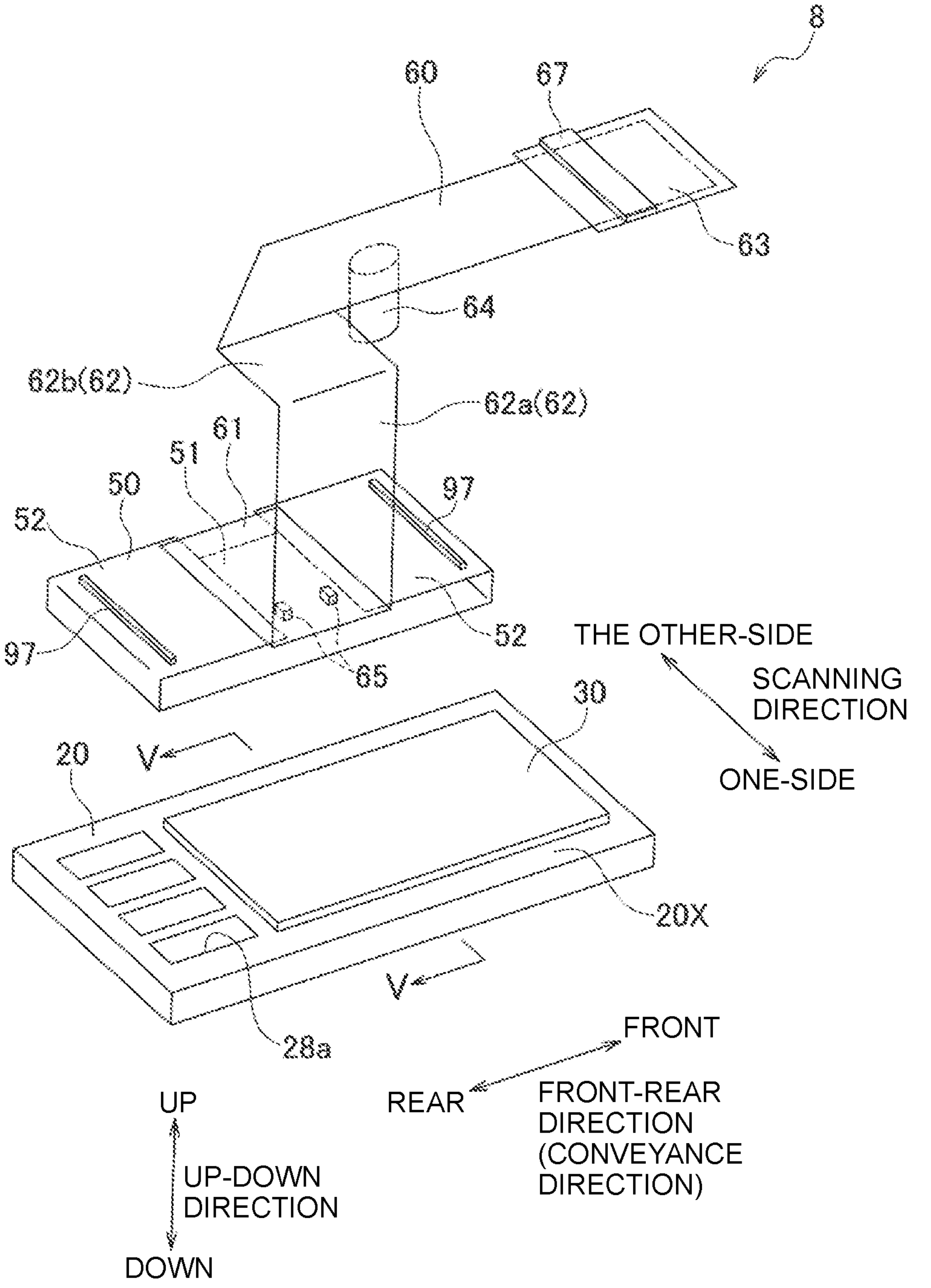
FIG. 4 depicts a partially exploded view of the inkjet head.
Figure 5:
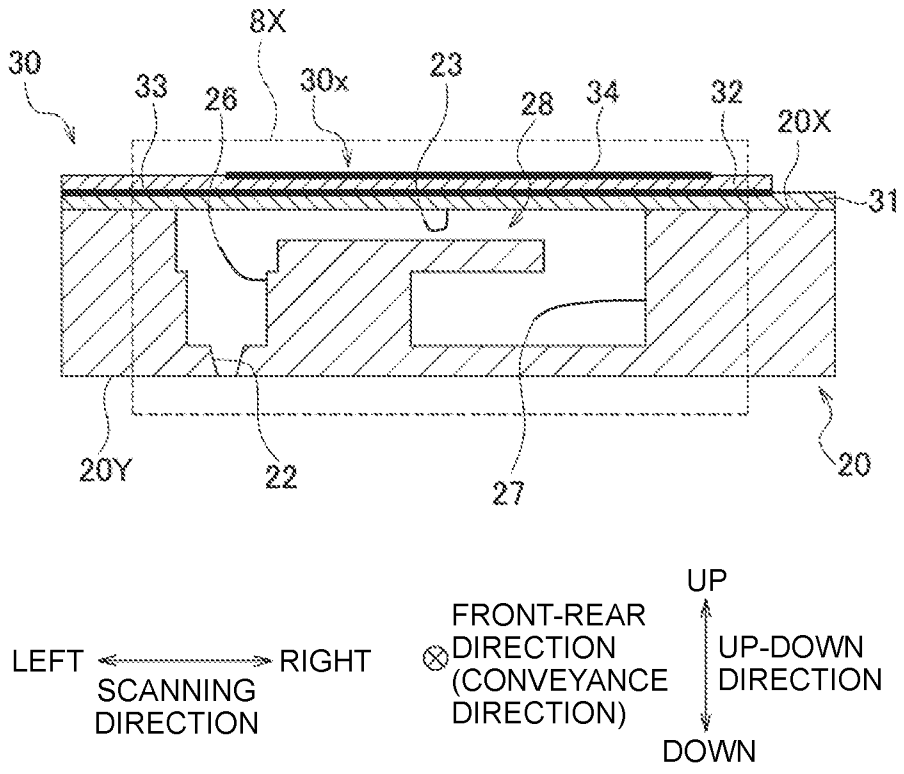
FIG. 5 is a V-V line partial cross-sectional view of a flow channel unit and an actuator unit depicted in FIG. 4.

As depicted in FIG. 4, the upper surface 20X of the flow channel unit 20 has four ink supply ports 28*a* aligned in the scanning direction. The ink from the four ink channels of the sub-tank 7 flow in the four ink supply ports 28*a*, respectively. As depicted in FIG. 5, the bottom surface of the flow channel unit 20 is a nozzle surface 20Y in which a plurality of nozzles 22 is opened.

The four intra-head flow channels 28 are formed inside the flow channel unit 20. In FIG. 5, only one intra-head flow channel 28 is depicted. Each of the intra-head flow channels 28 includes a plurality of individual flow channels 26 and one manifold 27 common to the plurality of individual flow channels 26. In other words, the flow channel unit 20 is provided with four manifolds 27. The four manifolds 27 are connected to the four ink flow channels of the sub-tank 7 via the ink supply port 28*a*. The individual flow channels 26 are provided individually for nozzles 22 and each of the individual flow channels has a pressure chamber 23 that is connected to the nozzle 22. Each of the individual flow channels 26 extends from the outlet of the manifolds 27 through the pressure chamber 23 to the nozzle 22. The ink fed from the sub-tank 7 into the manifolds 27 via the ink supply port 28*a* is supplied to each individual channel 26 and ejected from the nozzle 22. A plurality of pressure chambers 23 are opened on the upper surface 20X of the flow channel unit 20.

The actuator unit 30 includes piezoelectric layers 31 and 32, a common electrode 33, and a plurality of individual electrodes 34. The piezoelectric layers 31 and 32 include a piezoelectric material whose main component is lead zirconate titanate (PZT), which is a mixed crystal of lead titanate and lead zirconate. The piezoelectric materials such as the PZT are high dielectric constant materials, having a high dielectric constant. The piezoelectric layers 31 and 32 correspond to the "piezoelectric material" of the present disclosure. The piezoelectric layer 31 is disposed on the upper surface 20X of the flow channel unit 20 to cover the plurality of pressure chambers 23, and the piezoelectric layer 32 is disposed on the upper surface of the piezoelectric layer 31 and extends continuously over the plurality of pressure chambers 23. Instead of the piezoelectric layer 31, a layer made of an insulating material other than a piezoelectric material, such as a synthetic resin material, for example, may be arranged.

The common electrode 33 extends continuously across the plurality of pressure chambers 23 between the piezoelectric layers 31 and 32. The common electrode 33 is connected to the ground terminal 72 (see FIG. 6) as described below, and is held at ground potential. The plurality of individual electrodes 34 is individually provided corresponding to the plurality of pressure chambers 23. The plurality of individual electrodes 34 is provided at positions overlapping the pressure chambers 23 in the up-down direction. The plurality of individual electrodes 34 is connected to the driver IC 97 as described below. A drive voltage is applied to the plurality of individual electrodes 34 by outputting pulse signals individually by the driver IC 97. When a drive voltage is applied to the individual electrodes 34, the potential of the individual electrodes 34 switches between the ground potential and a positive potential (e.g., about 20 to 30 V).

The portion of the piezoelectric layer 32 sandwiched between the common electrode 33 and each of the individual electrodes 34 is polarized in the up-down direction. The portion of the actuator unit 30 that overlaps each of the pressure chambers 23 in the up-down direction is the piezoelectric element 30X. The piezoelectric elements 30X are deformable in response to the application of voltage to the individual electrodes 34. The deformation of the piezoelectric element 30X changes the volume of the pressure chamber 23, and pressure is applied to the ink in the pressure chamber 23 to eject ink from the nozzle 22. One individual flow channel 26 and the piezoelectric element 30X corresponding to the individual flow channel 26 are collectively referred to as a recording element 8X.

The COF 50 is electrically connected to the common electrode 33 and the plurality of the individual electrodes 34 of the actuator unit 30. As depicted in FIG. 4, the COF 50 is a band-shaped or strip-shaped trace member. In FIG. 4, traces in the COF 50 are omitted. In the following description, both ends of the COF 50 in a straightened state in the longitudinal direction are simply referred to as "both ends". The COF 50 has a central portion 51 located on the upper surface of the actuator unit 30 and two drawer portions 52 drawn upward from both ends in the conveyance direction in the central portion 51. The two drawer portions 52 are bent or curved above the central portion 51 so as to overlap vertically with the central portion 51 above the central portion 51. Thereby, the both ends of the COF 50 are positioned above the central portion 51 and overlap vertically with the central portion 51. The both ends of the COF 50 are spaced apart with respect to the conveyance direction.

Two driver ICs 97 are mounted on the two drawer portions 52, respectively. One of the two driver ICs 97 is electrically connected to the plurality of piezoelectric elements 30X located on one side of the conveyance direction in the actuator unit 30. The other of the two driver ICs 97 is electrically connected to the plurality of piezoelectric elements 30X located in the other side of the conveyance direction in the actuator unit 30.

The FPC 60 is a strip-shaped trace member. In FIG. 4, traces in the FPC 60 are omitted. The FPC 60 has a first connection portion 61 that is connected to the COF 50, an intermediate portion 62, and a second connection portion 63 that is connected to the junction substrate 70. One end in the longitudinal direction in the FPC 60 in a straightened state is the first connecting portion 61, and the other end is the second connecting portion 63. The portion between the first connecting portion 61 and the second connecting portion 63 of the FPC 60 is the intermediate portion 62.

The first connecting portion 61 is positioned above the COF 50, overlapping the COF 50 vertically. The first connection portion 61 is arranged to straddle the both ends of the COF 50. The first connection portion 61 is connected to both ends of the COF 50 by solder. A second capacitor 65 (corresponding to a "another capacitive element" of the present disclosure) is mounted on the first connection portion 61.

The intermediate portion 62 is bent at a middle portion thereof and is divided into a first portion 62*a* and a second portion 62*b* across the bent portion. The first portion 62*a* is drawn upward from the end of one side of the first connecting portion 61 in the scanning direction. The second portion 62*b* is located on the other side of the first portion 62*a* with respect to the scanning direction. The second portion 62*b* is in an orientation where a surface thereof is perpendicular to the up-down direction.

The second portion 62*b* is bent so that the upper and lower surfaces are reversed in a middle portion thereof. In other words, an upper surface of the second portion 62*b* becomes a lower surface of the second portion 62*b* across the bent portion. A portion of the second portion 62*b* on the side of the second connection portion 63 from the bent portion extends along the conveyance direction. A first capacitor 64 (corresponding to a "capacitive element" of the present disclosure) is mounted on the portion on the second connection portion 63 side than the bent portion in the second portion 62*b*.

The second connection portion 63 has a connector 67 that can be connected to the junction substrate 70 connector 74. The second connection portion 63 is supported by the support portion 16*a* in the case 16 of the recording head unit 6.

<Electrical Circuits>

Figure 6:
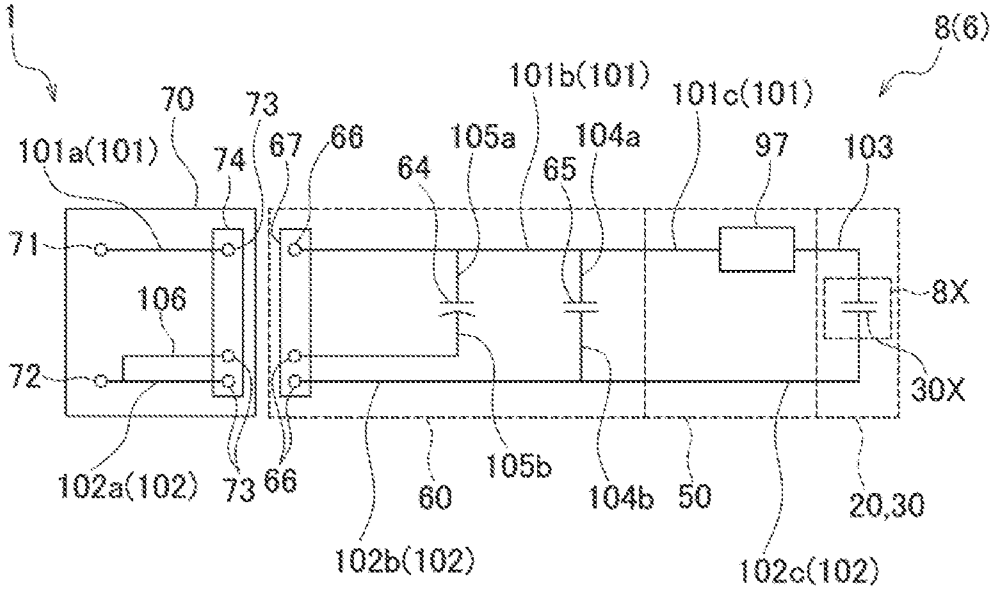
FIG. 6 depicts the electrical circuit that drives the inkjet head.

Next, with reference to FIG. 6, the electrical circuits that drive the inkjet head 8 are described. FIG. 6 depicts one circuit loop driving one of the recording elements 8X of the inkjet head 8. Each of the piezoelectric elements 30X included in the recording element 8X is an element in which the piezoelectric layer 32, that is a high dielectric constant material, is sandwiched between the common electrode 33 and one of the individual electrodes 34, and can be regarded as a kind of capacitor.

Voltage is supplied to the driver IC 97 mounted on the COF 50 via a power supply trace 101. The power supply trace 101 has a first trace 101*a* provided on the junction substrate 70, a second trace 101*b* provided on the FPC60, and a third trace 101*c* provided on the COF50. The first trace 101*a* connects the power supply terminal 71 and the output terminal 73 provided on the junction substrate 70. The voltage output from the power supply 98 is input to the power supply terminal 71. The second trace 101*b* connects the input terminal 66 provided on the FPC 60 to one end of the third trace 101*c*. The other end of the third trace 101*c*, that is an end opposite to the end connected to the second trace 101*b*, is connected to the driver IC 97.

When the junction substrate 70 and FPC60 are connected by the connector 74 and the connector 67, the first trace 101*a* of the junction substrate 70 and the second trace 101*b* of the FPC60 are electrically connected via the output terminal 73 of the junction substrate 70 and the input terminal 66 of the FPC60. This enables the voltage output from the power supply 98 to be supplied to the driver IC 97 via the power supply trace 101.

In the COF 50 and the actuator unit 30, a drive voltage-applying trace 103 is formed to connect the driver IC 97 and the individual electrodes 34 of the piezoelectric element 30X. The driver IC 97 applies drive voltage to the individual electrodes 34 via the drive voltage-applying trace 103.

A ground trace 102 is connected to the common electrode 33 of the piezoelectric element 30X. The ground trace 102 includes a first trace 102*a* provided on the junction substrate 70, a second trace 102*b* provided on the FPC 60, and a third trace 102*c* provided on the COF 50 and the actuator unit 30. The first trace 102*a* connects the ground terminal 72 provided on the junction substrate 70 to the output terminal 73. The ground terminal 72 is connected to ground. The second trace 102*b* connects the input terminal 66 provided on the FPC 60 to one end of the third trace 102*c*. The other end of the third trace 102*c*, that is an end opposite to the end connected to the second trace 102*b*, is connected to the common electrode 33 of the piezoelectric element 30X.

When the junction substrate 70 and the FPC 60 are connected by the connector 74 and connector 67, the first trace 102*a* of the junction substrate 70 and the second trace 102*b* of the FPC 60 are electrically connected via the output terminal 73 of the junction substrate 70 and the input terminal 66 of the FPC 60. As a result, the common electrode 33 of the piezoelectric element 30X becomes ground potential.

As described above, the first capacitor 64 and the second capacitor 65 are mounted on the FPC 60. The first capacitor 64 is, for example, an electrolytic capacitor. The second capacitor 65 is, for example, a ceramic capacitor. The capacitance of the second capacitor 65 and the capacitance of the piezoelectric element 30X are both smaller than that of the first capacitor 64. The first capacitor 64 is used for enabling instantaneous current supply to the driver IC 97 when the inkjet head 8 is driven at high speed. The second capacitor 65 is used for removing noise from the power supply 98.

The FPC 60 has traces 104*a* and 104*b* connected to the two terminals of the second capacitor 65, respectively. One end of the trace 104*a* is connected to one terminal of the second capacitor 65, and the other end is connected to the middle portion of the second trace 101*b* in the power supply trace 101. The trace 104*b* has one end connected to the other terminal of the second capacitor 65, and the other end is connected to the middle portion of the second trace 102*b* in the ground trace 102. As a result, the second capacitor 65 is connected between the power supply trace 101 and the ground trace 102.

The FPC 60 has traces 105*a* and 105*b* connected to the two terminals of the first capacitor 64, respectively. One end of trace 105*a* is connected to one terminal of the first capacitor 64, and the other end is connected to the middle portion of the second trace 101*b* in the power supply trace 101. More precisely, the other end of the trace 105*a* is connected between the portion of the second trace 101*b* to which the trace 104*a* is connected and the input terminal 66 in the second trace 101*b*. The trace 105*a* corresponds to the "first trace" of the present disclosure. Trace 105*b* has one end connected to the other terminal of the first capacitor 64 and the other end connected to the input terminal 66. The trace 105*b* corresponds to the "second trace" of the present disclosure. The junction substrate 70 has a connection trace 106, one end of which is connected to the midway portion of the first trace 102*a* in the ground trace 102 and the other end is connected to the output terminal 73.

When the junction substrate 70 and the FPC 60 are not connected, that is, when the first capacitor 64 is not connected to the connection trace 106 via the trace 105*b*, the first capacitor 64 is in the first state disconnected from the ground trace 102. When the junction substrate 70 and the FPC60 are connected by the connector 74 and the connector 67, the connection trace 106 of the junction substrate 70 and the trace 105*b* of the FPC60 are electrically connected via the output terminal 73 of the junction substrate 70 and the input terminal 66 of the FPC60. In other words, the connection trace 106 connects the first trace 102*a* to an end of the trace 105*b* opposite to the first capacitor 64. Thereby, the first capacitor 64 is connected to the ground trace 102 via the trace 105*b* and the connection trace 106. In other words, the first capacitor 64 is in the second state connected between the power supply trace 101 and the ground trace 102.

<Procedure for Electrical Inspection of Inkjet Head 8>

Here, with further reference to FIG. 7, an example of the electrical inspection procedure of the inkjet head 8 will be described. Such electrical inspection is performed during the manufacturing process of the recording head unit 6, and is performed while the junction substrate 70 and FPC 60 are not connected. At this time, the first capacitor 64 is in the first state disconnected from the ground trace 102. Such electrical inspection is used to check for missing parts, damaged circuits, circuit connections, etc.

Figure 7A:
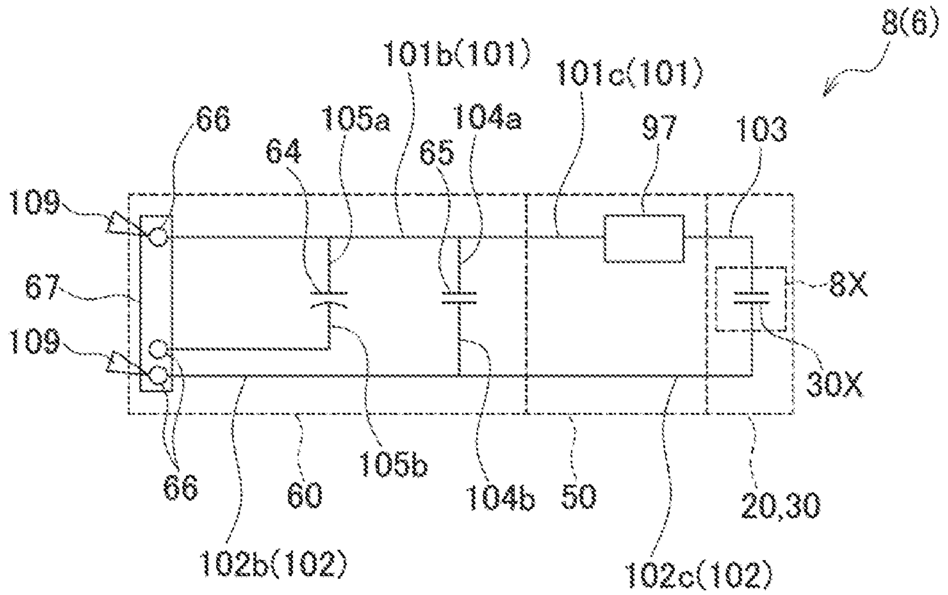
FIGS. 7A and 7B depict the electrical inspection procedure of the inkjet head.

As depicted in FIG. 7A, the probe 109 is brought into contact with an input terminal 66 of the FPC 60 to which the second trace 101*b* is connected and another input terminal 66 of the FPC 60 to which the second trace 102*b* is connected. At this time, a voltage is applied between the power supply trace 101 and the ground trace 102. This allows electrical inspection of electrical components other than the first capacitor 64, i.e., the second capacitor 65, driver IC 97, recording element 8X, etc.

Figure 7B:
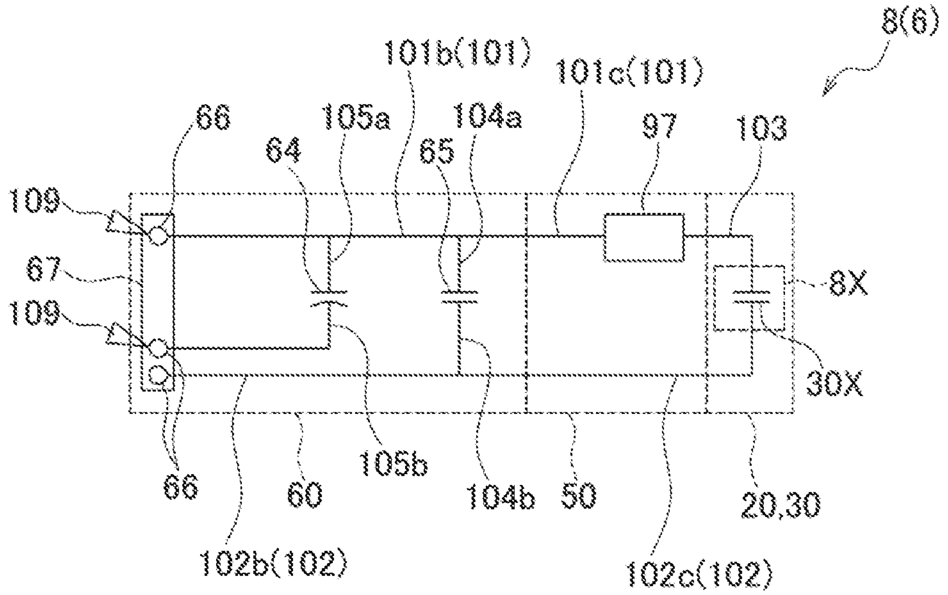

Next, as depicted in FIG. 7B, the probe 109 is brought into contact with the input terminal 66 of the FPC 60 to which the second trace 101*b* is connected and the input terminal 66 of the FPC 60 to which the trace 105*b* is connected. At this time, a voltage is applied between the pair of traces connected to the terminals at both ends of the first capacitor 64 respectively, i.e., between the second trace 101*b* and the trace 105*b*. This allows electrical inspection of the first capacitor 64 alone.

The order of the electrical inspection of electrical components other than the first capacitor 64 as depicted in FIG. 7A and the electrical inspection of the first capacitor 64 alone as depicted in FIG. 7B may be reversed. That is, the electrical inspection of the first capacitor 64 alone may be performed first, followed by the electrical inspection of the electrical components other than the first capacitor 64.

<Mounting Procedure for Recording Head Unit 6>

Next, with reference to FIG. 8, the procedure for attaching or mounting the recording head unit 6 to the carriage 4 is described.

First, as depicted in FIG. 8A, the recording head unit 6 is fitted into the opening 47 of the carriage 4 from above. At this time, the lever 44 of the carriage 4 is in the second position.

Figure 8C:
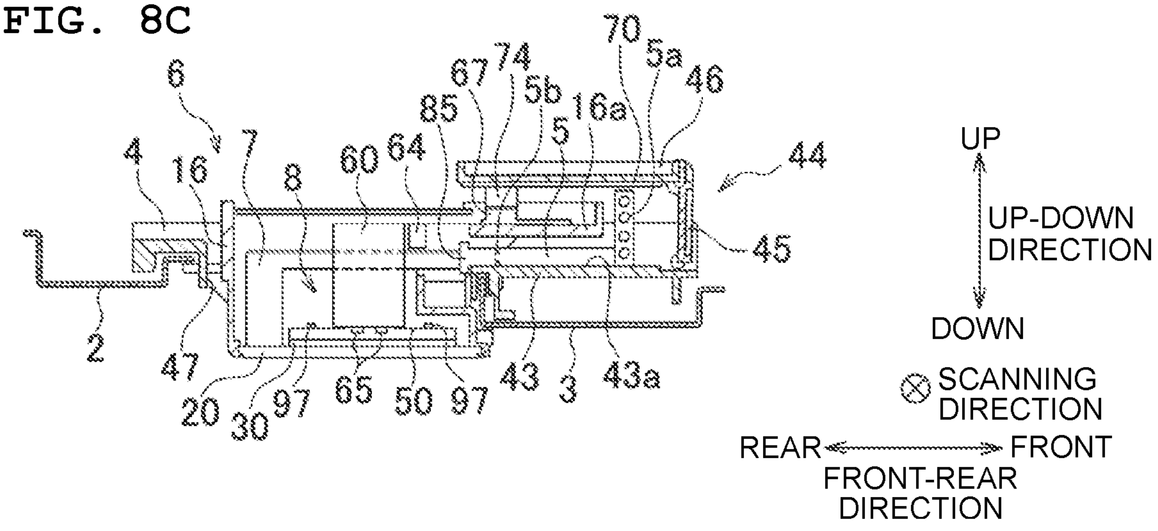

As depicted in FIG. 8B, when the recording head unit 6 is fitted into the opening 47 of the carriage 4, the connection member 85 attached to the sub-tank 7 is positioned on the surface 43*a* of the overlapping portion 43 of the carriage 4. Then, as depicted in FIG. 8C, the lever 44 is moved from the second position to the first position, and the connector 74 of the junction substrate 70 attached to the second member 46 of the lever 44 is connected to the connector 67 of the FPC 60. This electrically connects the actuator unit 30, which constitutes the inkjet head 8 of the recording head unit 6, to the junction substrate 70 via the COF 50 and the FPC 60.

As the lever 44 moves from the second position to the first position, the tube joint 5 slides from the front side to the rear side. This connects the tube joint 5 to the sub-tank 7 via the connecting member 85.

Technical Features of the Embodiment

As described above, in the printer 1, the recording head unit 6 supported by the carriage 4 has a part of the power supply trace 101 connected to the power supply terminal 71, a part of the ground trace 102 connected to the ground terminal 72, and the driver ICs 97 to which voltage is supplied by the power supply trace 101. Further, the recording head unit 6 has the recording element 8X to which the drive voltage is supplied by the driver IC 97 and the ground trace 102 is connected, and the first capacitor 64. The carriage 4 has the connection trace 106 that can be connected to the other terminal of the first capacitor 64. When the first capacitor 64 is not connected to the connection trace 106, the first capacitor 64 is in the first state disconnected from the ground trace 102. When the first capacitor 64 is connected to the connection trace 106, the first capacitor 64 is in the second state connected between the trace 101 and the ground trace 102 via the connection trace 106. When the first capacitor 64 is not connected to the connection trace 106, a voltage can be applied, by the probe 109, between the second trace 101*b* and the trace 105*b* connected to the terminals at both ends of the first capacitor 64 respectively.

With the configuration described above, when the first capacitor 64 is not connected to the connection trace 106 provided in the carriage 4, the first capacitor 64 is in the first state disconnected from the ground trace 102. At this time, a voltage can be applied, by the probe 109, between the second trace 101*b* and the trace 105*b*, which are connected to both ends of the first capacitor 64 respectively. Therefore, when the first capacitor 64 is not connected to the connection trace 106 provided in the carriage 4, the electrical inspection of the first capacitor 64 alone can be performed. Therefore, it is possible to accurately detect defects in the first capacitor 64 alone.

The printer 1 of the embodiment described above is configured so that when the first capacitor 64 is not connected to the connection trace 106, a voltage can be applied, by the probe 109, between the power supply trace 101 and the ground trace 102 provided in the inkjet head 8. Therefore, when the first capacitor 64 is not connected to the connection trace 106 provided in the carriage 4, by applying a voltage between the power supply trace 101 and the ground trace 102 provided in the inkjet head 8 by means of the probe 109, the electrical inspection of electrical components other than the first capacitor 64 of the inkjet head 8 (e.g., the recording element 8X and the driver ICs 97) can be performed. Therefore, it is possible to detect defects in electrical components other than the first capacitor 64 of the inkjet head 8.

Furthermore, in the printer 1 of the embodiment described above, the recording element 8X has the nozzles 22 configured to eject the ink, the pressure chambers 23 that are connected to the nozzles 22, and the piezoelectric elements 30X including the piezoelectric layers 31 and 32 and configured to apply pressure to the ink in the pressure chambers 23. In other words, the recording element 8X has piezoelectric layers 31 and 32 that can store electric charges. If the capacitance of the first capacitor 64 is sufficiently larger than that of the recording element 8X, it is difficult to determine whether the capacitance value of the recording element 8X is correct when the first capacitor 64 and the recording element 8X are inspected simultaneously when measuring capacitance in electrical inspection. In this configuration, the first capacitor 64 and the recording element 8X can be inspected separately, so the capacitance measurement of the recording element 8X can be performed properly.

In addition, in the printer 1 of the embodiment described above, the inkjet head 8 has the second capacitor 65 that has a capacitance smaller than that of the first capacitor 64 and that is connected between the power supply trace 101 and the ground trace 102. If the capacitance of the first capacitor 64 is sufficiently larger than that of the second capacitor 65, it is difficult to determine whether the second capacitor 65 is mounted correctly when the first capacitor 64 and the second capacitor 65 are inspected simultaneously when measuring capacitance in electrical inspection. In this configuration, the first capacitor 64 and the second capacitor 65 can be inspected separately, so it is possible to properly detect whether the second capacitor 65 is mounted correctly.

Furthermore, the printer 1 in the embodiment described above has a junction substrate 70 on which the power supply terminal 71 and the ground terminal 72 are provided. The recording head unit 6 has the flow channel unit 20 and the actuator unit 30 in which the recording element 8X is provided, the COF 50 in which the driver ICs 97 are mounted, and the FPC 60 in which the first capacitor 64 is mounted. A part of the power supply trace 101 and a part of the ground trace 102 is provided in the FPC 60. The junction substrate 70 and the FPC 60 are electrically detachable, and when the junction substrate 70 and FPC 60 are electrically connected, the actuator unit 30 and the junction substrate 70 are electrically connected via the COF 50 and the FPC 60. The connection trace 106 is provided on the junction substrate 70, and the first capacitor 64 is in the first state when the junction substrate 70 and the FPC 60 are not electrically connected, and in the second state when the junction substrate 70 and the FPC 60 are electrically connected. Therefore, by electrically connecting the junction substrate 70 and the FPC 60, the first capacitor 64 is set to the second state, and the first capacitor 64 makes it possible to instantly supply current to the driver ICs 97 during image recording.

In the printer 1 of the embodiment described above, the other terminal of the first capacitor 64 is disconnected from the ground trace 102 when the first capacitor is in the first state. The connection trace 106 can connect the end portion on the opposite side of the trace 105*b* connected to the other terminal of the first capacitor 64 in the FPC 60 to the portion provided on the junction substrate 70 in the ground trace 102. Therefore, by connecting the junction substrate 70 and the FPC 60, the other terminal of the first capacitor 64 can be connected to the ground trace 102 via the connection trace 106 provided on the junction substrate 70.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

Although embodiments of the disclosure have been described above on the basis of the drawings, specific configurations should not be considered limited to these embodiments. The scope of the disclosure is indicated by the claims rather than by the description of the embodiments above, and further includes all modifications within the meaning and scope equivalent to the claims.

Figure 9:
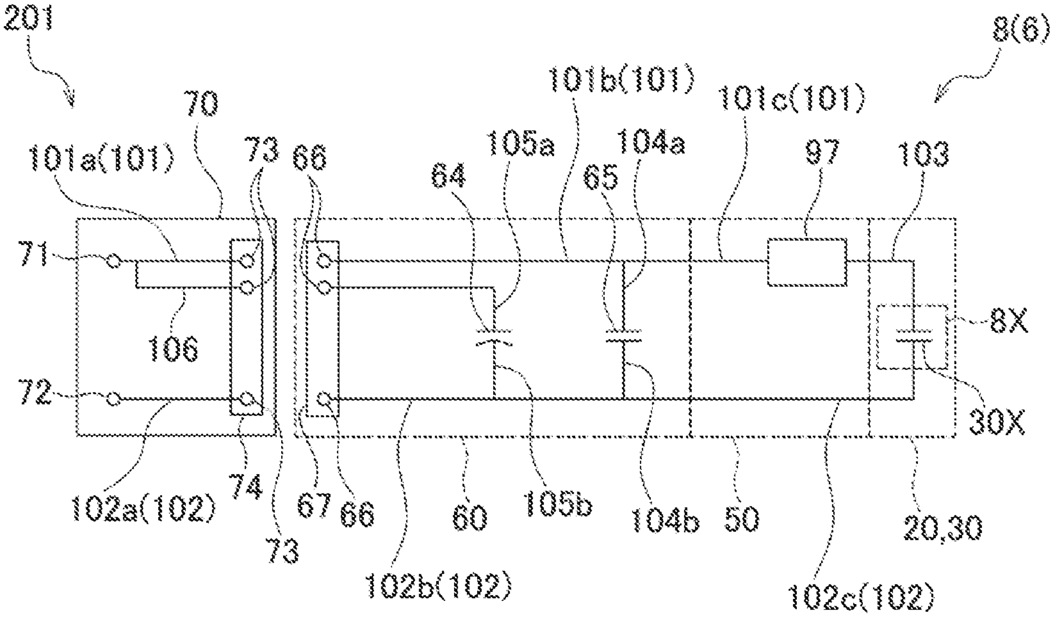
FIG. 9 depicts the electrical circuit that drives the inkjet head.

In the embodiment described above, the case in which the first capacitor 64 is in the first state disconnected from the ground trace 102 when not connected to the connection trace 106 is described, but the present disclosure is not limited to this case. That is, for example, as depicted in FIG. 9, in the printer 201, the first capacitor 64 is in the first state disconnected from the power supply trace 101 when not connected to the connection trace 106.

In the printer 201, the trace 105*a* in the FPC 60 has one end connected to one terminal of the first capacitor 64 and the other end connected to the input terminal 66. In addition, trace 105*b* has one end connected to the other terminal of the first capacitor 64, and the other end is connected to the middle portion of the second trace 102*b* in the ground trace 102. The connection trace 106 provided on the junction substrate 70 connects the middle portion of the first trace 101*a* in the power supply trace 101 to the output terminal 73. In this modification, the trace 105*a* corresponds to the "second trace" of the present disclosure and the trace 105*b* corresponds to the "first trace" of the present disclosure.

In the printer 201, when the junction substrate 70 and the FPC 60 are not electrically connected, that is, when the first capacitor 64 is not connected to the connection trace 106 via the trace 105*a*, the first capacitor 64 is in the first state disconnected from the power supply trace 101. When the junction substrate 70 and the FPC 60 are electrically connected by the connector 74 and the connector 67, the first capacitor 64 is connected to the power supply trace 101 via the trace 105*a* and the connection trace 106. In other words, the first capacitor 64 is in the second state connected between the power supply trace 101 and the ground trace 102.

When conducting the electrical inspection of the inkjet head 8 in the printer 201, for example, the probe 109 is brought into contact with the input terminal 66 of the FPC 60 to which the second trace 101*b* is connected, the input terminal 66 of the FPC 60 to which the trace 105*a* is connected, and the input terminal 66 of the FPC 60 to which the second trace 102*b* is connected. Then, different voltages are applied simultaneously between the second trace 101*b* and the second trace 102*b* and between the trace 105*a* and the second trace 102*b*. For example, a voltage of 20 V is applied between the second trace 101*b* and the second trace 102*b*, and a voltage of 10 V is applied between the trace 105*a* and the second trace 102*b*. In other words, the electrical inspection of the second capacitor 65, driver IC 97, recording element 8X, etc., and the electrical inspection of the first capacitor 64 alone can be performed simultaneously.

Therefore, the inspection time can be reduced compared to when these inspections are performed separately.

When electrical inspection of the first capacitor 64 alone is not possible, i.e., when the electrical inspection of the first capacitor 64 is performed together with the driver ICs 97, a current greater than the rated current of the driver IC 97 cannot flow during the electrical inspection. Therefore, the charging time to the first capacitor 64 is longer and the inspection time is longer. In the printer 201, it is possible to pass a current greater than the rated current of the driver IC 97 to the first capacitor 64. Therefore, the charging to the first capacitor 64 is completed in a short time and the inspection time can be shortened.

Figure 10A:
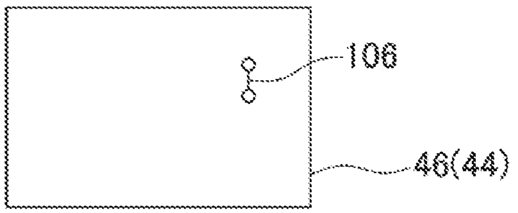
FIG. 10A depicts an example of a connection trace.

In the embodiment described above, the case in which the connection trace 106 is provided in the junction substrate 70 in the carriage 4 is described, but the connection trace 106 may be provided in a part other than the junction substrate 70 in the carriage 4. For example, in a printer 301 (see FIG. 10B) and a printer 401 (see FIG. 10C), for example, the connection trace 106 is a conductive pattern formed, in the second resin member 46 forming the lever 44 in the carriage 4, as depicted in FIG. 10A. The second member 46 of the lever 44 covers the support portion 16*a* in the case 16 of the recording head unit 6 when the lever 44 is in the first position, and the second member 46 corresponds to a “cover” of the present disclosure.

Figure 10B:
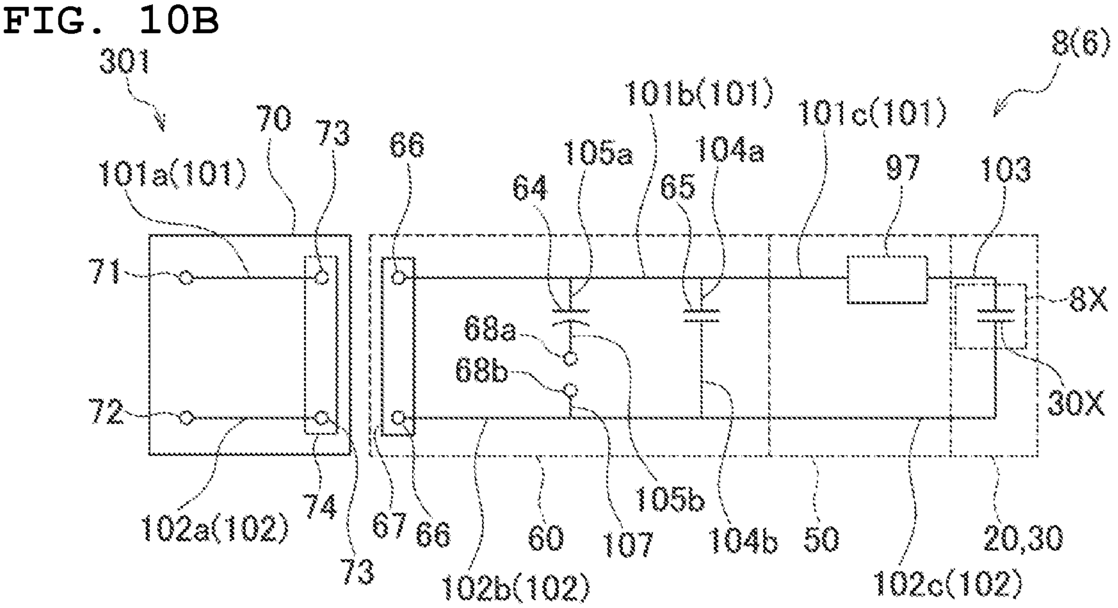
FIG. 10B depicts an electrical circuit that drives the inkjet head.

As depicted in FIG. 10B, in the printer 301, the trace 105*b* in the FPC 60 has one end connected to the other terminal of the first capacitor 64 and the other end connected to the terminal 68*a*. Furthermore, the FPC 60 has the ground connection trace 107 that connects the middle portion of the second trace 102*b* to the terminal 68*b*. The portion of the FPC 60 with the terminals 68*a* and 68*b* is supported by the support portion 16*a* of the case 16. When the lever 44 is in the first position and the second member 46 of the lever 44 covers the support portion 16*a*, the connection trace 106 formed in the second member 46 electrically connects between the terminals 68*a* and 68*b*. In other words, the first capacitor 64 is connected to the connection trace 106. Thereby, an end, of the trace 105*b*, opposite to the first capacitor 64 and an end, of the ground connection trace 107, opposite to the ground trace 102 are electrically connected. In this modification, the ground connection trace 107 and the connection trace 106 correspond to the “connection trace” of the present disclosure.

In the printer 301, the first capacitor 64 is in the first state with the other terminal disconnected from the ground trace 102 when not connected to the connection trace 106. When the first capacitor 64 is connected to the connection trace 106, it is in the second state connected between the power supply trace 101 and the ground trace 102 via the connection trace 106.

When performing the electrical inspection of the inkjet head 8 in the printer 301, for example, the probe 109 is brought into contact with the input terminal 66 of the FPC 60 to which the second trace 101*b* is connected and the input terminal 66 of the FPC 60 to which the second trace 102*b* is connected, and then the electrical inspection for the second capacitor 65, driver IC 97, the recording element 8X, etc. is performed. Furthermore, the electrical inspection of the first capacitor 64 alone is conducted by bringing the probe 109 into contact with the input terminal 66 and terminal 68*a* of the FPC60 to which the second trace 101*b* is connected. The order of the electrical inspection is not limited to this.

Figure 10C:
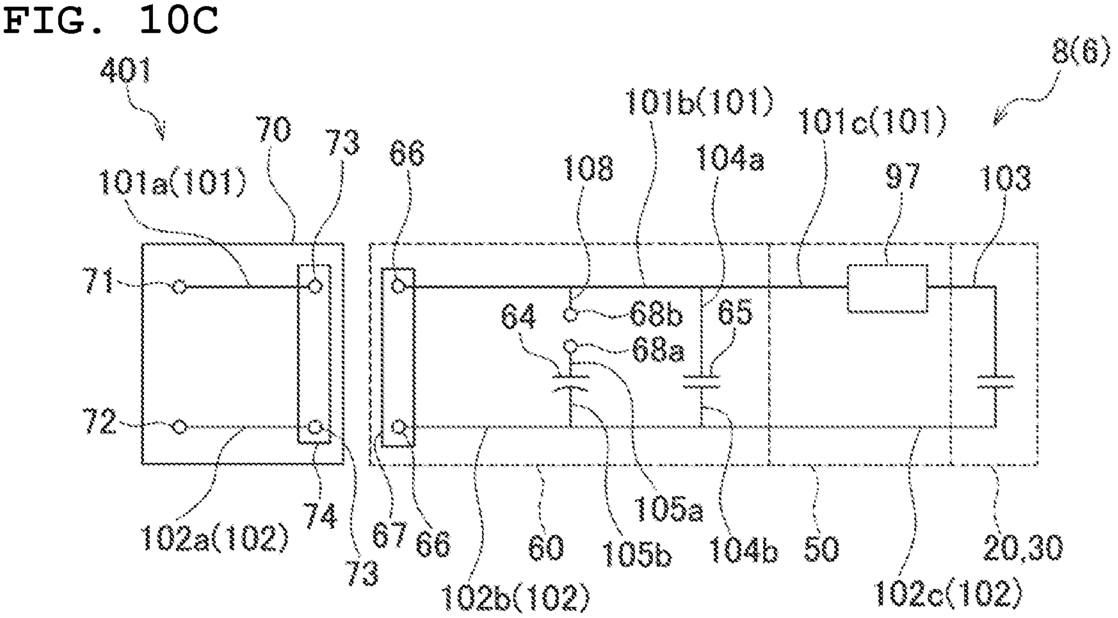
FIG. 10C depicts an electrical circuit that drives the inkjet head.

As depicted in FIG. 10C, in the printer 401, the trace 105*a* in the FPC 60 has one end connected to one terminal of the first capacitor 64 and the other end connected to the terminal 68*a*. Furthermore, the FPC 60 has the power supply connection trace 108 that connects the middle portion of the second trace 101*b* to the terminal 68*b*. The portions with terminals 68*a* and 68*b* in the FPC 60 are supported by the support portion 16*a* of the case 16. One end of the trace 105*b* is connected to the other terminal of the first capacitor 64, and the other end is connected to the middle portion of the second trace 102*b*. When the lever 44 is in the first position and the second member 46 of the lever 44 covers the support portion 16*a*, the connection trace 106 formed in the second member 46 electrically connects between the terminals 68*a* and 68*b*. In other words, the first capacitor 64 is connected to the connection trace 106. Thereby, an end of the trace 105*a* opposite to the first capacitor 64 and an end of the power supply connection trace 108 opposite to the power supply trace 101 side are electrically connected. In this modification, the power supply connection trace 108 and the connection trace 106 correspond to the “connection trace” of the present disclosure.

In the printer 401, the first capacitor 64 is in the first state with one terminal disconnected from the power supply trace 101 when not connected to the connection trace 106. When the first capacitor 64 is connected to the connection trace 106, the first capacitor 64 is in the second state connected between the power supply trace 101 and the ground trace 102 via the connection trace 106.

When performing the electrical inspection of the inkjet head 8 in the printer 401, for example, the probe 109 is brought into contact with the input terminal 66 of the FPC 60 to which the second trace 101*b* is connected and the input terminal 66 of the FPC 60 to which the second trace 102*b* is connected, and then the electrical inspection for the second capacitor 65, driver ICs 97, the recording element 8X, etc. is performed. Furthermore, electrical inspection of the first capacitor 64 alone is conducted by bringing the probe 109 into contact with the input terminal 66 and terminal 68*a* of the FPC60 to which the second trace 102*b* is connected. The order of electrical inspection is not limited to this.

Furthermore, the embodiments and modifications described above are not limited to the description of the connection trace 106 that can be connected to one terminal of the first capacitor 64. That is, for example, a connection trace with one end connected to the power supply trace 101 and another connection trace with one end connected to the ground trace 102 are provided on the junction substrate 70, and these two connection traces may be connectable to the traces 105*a* and 105*b* connected to the two terminals of the first capacitor 64 respectively.

In the embodiment described above, the first capacitor 64 is an electrolytic capacitor and the second capacitor 65 is a ceramic capacitor, but it is not limited to this case. The first capacitor 64 can be any capacitive element capable of storing electric charges. The second capacitor 65 need only be a capacitive element whose capacitance is smaller than the first capacitor 64. The second capacitor 65 need not be provided.

Furthermore, in the embodiment described above, when the first capacitor 64 is not connected to the connection trace 106, the probe 109 is brought into contact with the input terminal 66 of the FPC 60 to which the second trace 101*b* is connected and the input terminal 66 of the FPC 60 to which the second trace 102*b* is connected, and the probe 109 is used to apply voltage between the power supply trace 101. The present disclosure is not limited to the case in which the probe 109 is configured to apply a voltage between the power supply trace 101 and the ground trace 102. That is, for example, the input terminal 66 to which the second trace

102*b* is connected may be configured such that the probe 109 cannot be brought into contact.

In the embodiment described above, the recording head unit 6 is described as having the COF 50 on which the driver ICs 97 are mounted and the FPC 60 on which the first capacitor 64 is mounted, but the present disclosure is not limited to this. That is, for example, the driver ICs 97 and the first capacitor 64 may be mounted on the same trace member.

Furthermore, the above embodiment describes a case in which the power supply terminal 71 and the ground terminal 72 are provided on the junction substrate 70, but the present disclosure is not limited to this case. That is, the power supply terminal 71 and the ground terminal 72 may be provided on substrates or trace members other than the junction substrate 70. The power supply terminal 71 and the ground terminal 72 may be provided on different members.

Furthermore, although the above embodiment describes a serial type printer 1, the present disclosure can also be applied to a line type printer. In the embodiment described above, the connection trace 106 is provided in the carriage 4, which is movable in the scanning direction and supports the recording head unit 6. When the present disclosure is applied to a line type printer, trace members are provided in the part that supports the line type recording head unit.

In addition, the above embodiment describes the inkjet head 8 that ejects ink from the nozzles 22 by applying pressure to ink in pressure chambers 23 with piezoelectric elements 30X, but the ink ejection method of the inkjet head is not limited to this. That is, for example, ink may be ejected from the nozzles by heating the ink in the pressure chamber with a heating element to generate bubbles in the pressure chamber.

The invention can be applied not only to inkjet printers equipped with a head that ejects ink from the nozzles, but also to LED printers, for example, where an electrostatic latent image is formed by exposing a photosensitive material with an LED.

What is claimed is:

1. An image recording apparatus comprising:
a recording head unit;
a head support configured to support the recording head unit;
a power supply trace connected to a power supply terminal;
a ground trace connected to a ground terminal; and
a substrate including the power supply terminal and the ground terminal,
wherein the recording head unit includes:
a portion of the power supply trace;
a portion of the ground trace;
a drive circuit to which a voltage is supplied via the power supply trace;
a recording element to which a drive voltage is applied by the drive circuit and to which the ground trace is connected; and
a capacitive element,
the head support includes a connection trace to be connected to at least one terminal of a pair of terminals of the capacitive element,
the capacitive element is configured such that:
the capacitive element is in a first state disconnected from at least one of the power supply trace and the ground trace in a case that the capacitive element is not connected to the connection trace, and that
the capacitive element is in a second state connected between the power supply trace and the ground trace via the connection trace in a case that the capacitive element is connected to the connection trace, and
in a case that the capacitive element is not connected to the connection trace, a voltage between a pair of traces connected to the pair of terminals of the capacitive element is applied by a probe; and
wherein the recording head unit includes:
a head including the recording element;
a first trace member including the drive circuit; and
a second trace member including the capacitive element, the portion of the power supply trace and the portion of the ground trace,
the substrate and the second trace member are electrically detachable, and in a case that the substrate and the second trace member are electrically connected, the head and the substrate are electrically connected via the first trace member and the second trace member,
the connection trace is provided on the substrate,
the capacitive element is in the first state in a case that the substrate and the second trace member are not electrically connected, and
the capacitive element is in the second state in a case that the substrate and the second trace member are electrically connected.

2. The image recording apparatus according to claim 1, wherein
in a case that the capacitive element is not connected to the connection trace, a voltage is applied between the power supply trace and the ground trace in the recording head unit by the probe.

3. The image recording apparatus according to claim 2, wherein
the recording element includes:
a nozzle configured to discharge a liquid;
a pressure chamber connected to the nozzle; and
a piezoelectric element including a piezoelectric material and configured to apply a pressure to the liquid in the pressure chamber.

4. The image recording apparatus according to claim 2, wherein
the recording head unit further includes another capacitive element having a capacitance smaller than the capacitance of the capacitive element and connected to the power supply trace and to the ground trace.

5. The image recording apparatus according to claim 1, wherein
in a case that the capacitive element is in the first state, the one terminal of the pair of terminals of the capacitive element is disconnected from the ground trace,
the connection trace is to be connected to an end of a trace in the second trace member, the end of the trace being opposite to an end connected to the one terminal of the pair of the terminals of the capacitive element, and the connection trace is to be connected to the portion of the ground trace.

6. The image recording apparatus according to claim 1, wherein
in a case that the capacitive element is in the first state, the one terminal of the pair of terminals of the capacitive element is disconnected from the power supply trace,
the connection trace is to be connected to an end of a trace in the second trace member, the end of the trace being opposite to an end connected to the one terminal of the pair of the terminals of the capacitive element, and the connection trace is to be connected to the portion of the power supply trace.

7. The image recording apparatus according to claim 1, further comprising a cover configured to cover at least a part of the recording head unit and is made of an insulating material, wherein in a case that the capacitive element is in the first state, the one terminal of the pair of terminals of the capacitive element is disconnected from the ground trace, the recording head unit further includes a ground connection trace connected to the ground trace, and the connection trace is a conductive pattern formed on the cover, and in a case that the cover covers the recording head unit, the connection trace is to be connected to an end, of a trace, that is opposite to an end connected to the one terminal of the pair of the terminals of the capacitive element, and the connection trace is to be connected to an end, of the ground connection trace, that is opposite to an end connected to the ground trace.

8. The image recording apparatus according to claim 1, further comprising a cover configured to cover at least a part of the recording head unit and is made of an insulating material, wherein in a case that the capacitive element is in the first state, the one terminal of the pair of terminals of the capacitive element is disconnected from the power supply trace, the recording head unit further includes a power supply connection trace connected to the power supply trace, and the connection trace is a conductive pattern formed on the cover, and in a case that the cover covers the recording head unit, the connection trace is to be connected to an end, of a trace, that is opposite to an end connected to the one terminal of the pair of the terminals of the capacitive element, and the connection trace is to be connected to an end, of the power supply connection trace, that is opposite to an end connected to the power supply trace.

9. An image recording apparatus comprising:

a recording head unit;

a head support configured to support the recording head unit;

a power supply trace connected to a power supply terminal;

a ground trace connected to a ground terminal;

a substrate including the power supply terminal and the ground terminal; and a connection trace including one end connected to one trace of the power supply trace and the ground trace, wherein the recording head unit includes:

a portion of the power supply trace;

a portion of the ground trace;

a drive circuit to which a voltage is supplied via the power supply trace;

a recording element to which a drive voltage is applied by the drive circuit and to which the ground trace is connected;

a capacitive element;

a first trace including one end connected to one of a pair of terminals of the capacitive element; and a second trace including one end connected to the other of the pair of terminals of the capacitive element, the other end of the first trace is connected to the other trace of the power supply trace and the ground trace, a portion of the connection trace including the other end of the connection trace is located in the head support and the other end of the connection trace is to be connected to the other end of the second trace, in a case that the second trace is not connected to the connection trace, a voltage between the first trace and the second trace connected to the pair of terminals of the capacitive element is applied by a probe;

wherein the recording head unit includes:

a head including the recording element;

the first trace including the drive circuit; and the second trace including the capacitive element, the portion of the power supply trace and the portion of the ground trace, the substrate and the second trace are electrically detachable, and in a case that the substrate and the second trace are electrically connected, the head and the substrate are electrically connected via the first trace and the second trace, the connection trace is provided on the substrate, the capacitive element is in the first state in a case that the substrate and the second trace member are not electrically connected, and the capacitive element is in the second state in a case that the substrate and the second trace member are electrically connected.

* * * * *